United States Patent
Gambiana et al.

(10) Patent No.: US 7,075,255 B1
(45) Date of Patent: Jul. 11, 2006

(54) VARIABLE SPEED CONTROLLER FOR A FAMILY OF MULTI-TAP MOTORS

(75) Inventors: Dennis S. Gambiana, Bloomington, MN (US); Bradford L. Blankenship, Orono, MN (US)

(73) Assignee: Varidigm Corporation, Plymouth, MN (US)

( * ) Notice: Subject to any disclaimer, the term of this patent is extended or adjusted under 35 U.S.C. 154(b) by 0 days.

(21) Appl. No.: 11/189,333

(22) Filed: Jul. 26, 2005

(51) Int. Cl.
*H02P 7/00* (2006.01)
*H02P 7/06* (2006.01)

(52) U.S. Cl. .................. 318/66; 318/772; 318/821; 318/825

(58) Field of Classification Search ............... 318/776, 318/772, 66, 821, 825
See application file for complete search history.

(56) References Cited

U.S. PATENT DOCUMENTS

| | | | |
|---|---|---|---|
| 4,443,749 A * | 4/1984 | Douthart et al. | 318/774 |
| 4,467,257 A * | 8/1984 | Douthart et al. | 318/774 |
| 5,041,775 A * | 8/1991 | Erdman | 318/812 |
| 5,614,799 A * | 3/1997 | Anderson et al. | 318/439 |
| 5,650,697 A * | 7/1997 | Imagi et al. | 318/254 |
| 5,650,707 A * | 7/1997 | Lipo et al. | 318/773 |
| 5,680,021 A * | 10/1997 | Hollenbeck | 318/432 |
| 5,867,005 A * | 2/1999 | Brown | 318/751 |
| 6,329,783 B1 * | 12/2001 | Vrionis et al. | 318/772 |
| 6,801,013 B1 * | 10/2004 | Woodward et al. | 318/804 |
| 6,864,659 B1 * | 3/2005 | Ratz et al. | 318/772 |
| 6,866,202 B1 | 3/2005 | Sigafus et al. | 236/11 |
| 2004/0230402 A1 * | 11/2004 | St. Jean | 702/189 |

* cited by examiner

*Primary Examiner*—Rita Leykin
(74) *Attorney, Agent, or Firm*—Pauley Petersen & Erickson

(57) ABSTRACT

A system for variable speed motor control provides continuous variable speed motor controller for each motor or motor application within a family of multi-tap motors while using a single controller. The single controller utilizes a wave chop technique providing variable speed motor control through the operating range for each motor tap and seamlessly passes the motor control to each succeeding tap to provide smoothly varying and continuous variable speed motor control throughout the operating range of the multi-tap motor. The system can use a small wave chop firing angle for each tap, thus maximizing the signal to the motor for each tap and minimizing heat build up in the motor. By selecting the controller to operate on a tap basis, an entire family of motors or motor applications can be accommodated with a single controller and apparatus.

23 Claims, 3 Drawing Sheets

| Furnace Size | H.P. Motor | | Low Tap Firing Angle | | | Medium Low Tap Firing Angle | | | Medium Tap Firing Angle | | | High Tap Firing Angle | | |
|---|---|---|---|---|---|---|---|---|---|---|---|---|---|---|
| | | Firing Angle | 80 | 50 | 40 | 60 | 50 | 40 | 60 | 50 | 40 | 65 | 60 | 50 |
| 60K BTU | 0.50 | RPM | 400 | 700 | 750 | 750 | 830 | 900 | 900 | 950 | 1000 | 1005 | 1040 | 1100 |
| | | % Range | 1% | 43% | 50% | 50% | 61% | 71% | 71% | 79% | 86% | 86% | 91% | 100% |
| 80K BTU narrow | 0.50 | RPM | 480 | 800 | 850 | 860 | 930 | 980 | 1000 | 1040 | 1060 | 1065 | 1090 | 1100 |
| | | % Range | 11% | 57% | 64% | 66% | 76% | 83% | 86% | 91% | 94% | 95% | 99% | 100% |
| 80K BTU wide | 0.75 | RPM | 500 | 800 | 900 | 900 | 950 | 980 | 1010 | 1030 | 1060 | 1070 | 1090 | 1100 |
| | | % Range | 14% | 57% | 71% | 71% | 79% | 83% | 87% | 91% | 94% | 96% | 99% | 100% |
| 100K BTU | 0.75 | RPM | 400 | 640 | 710 | 720 | 850 | 880 | 880 | 980 | 1000 | 1000 | 1040 | 1100 |
| | | % Range | 1% | 34% | 44% | 46% | 64% | 69% | 69% | 83% | 86% | 86% | 91% | 100% |
| 120K BTU | 1.00 | RPM | 500 | 740 | 780 | 800 | 880 | 960 | 960 | 1000 | 1040 | 1060 | 1080 | 1100 |
| | | % Range | 14% | 49% | 54% | 57% | 69% | 80% | 80% | 86% | 92% | 94% | 97% | 100% |

TABLE 1

| | Low Tap | | Medium-Low Tap | | Medium Tap | | High Tap | |
|---|---|---|---|---|---|---|---|---|
| RPM | 400 | 750 | 750 | 900 | 900 | 1000 | 1000 | 1100 |
| Percent | 1% | 50% | 50% | 71% | 71% | 86% | 86% | 100% |

TABLE 2

| Control Algorithm | Low Tap | | Medium-Low Tap | | Medium Tap | | High Tap | |
|---|---|---|---|---|---|---|---|---|
| Firing Angle | 80 | 40 | 60 | 40 | 60 | 40 | 65 | 50 |
| Percent | 1% | 50% | 50% | 71% | 71% | 86% | 86% | 100% |
| Hysterisis Algorithm | Low Tap | | Medium-Low Tap | | Medium Tap | | High Tap | |
| Firing Angle | 80 | 40 | 65 | 40 | 63 | 40 | 70 | 50 |
| Percent | 1% | 50% | 43% | 71% | 68% | 86% | 81% | 100% |

TABLE 3

| Control Algorithm | Low Tap | | Medium Tap | | High Tap | |
|---|---|---|---|---|---|---|
| Firing Angle | 80 | 40 | 60 | 40 | 65 | 50 |
| Percent | 1% | 54% | 54% | 70% | 70% | 100% |
| Hysterisis Algorithm | Low Tap | | Medium Tap | | High Tap | |
| Firing Angle | 80 | 40 | 63 | 40 | 70 | 50 |
| Percent | 1% | 50% | 50% | 86% | 61% | 100% |

TABLE 4

VARIABLE SPEED CONTROLLER FOR A FAMILY OF MULTI-TAP MOTORS

BACKGROUND OF THE INVENTION

1. Field of the Invention

The present invention relates to the variable speed control of electric motors. More particularly, the present invention relates to the utilization of a single speed controller applied to a family of multi-tap electric motors.

2. Discussion of the Related Art

Many applications for electric motors demand variable speeds with a known load on the motor. For example a blower motor in a household heating, ventilation and air-conditioning (HVAC) system will typically be a fractional horsepower motor driving a blower unit or fan blade which represents a known load varying regularly by speed in revolutions per minute.

Multi-tap motors may desirably be utilized in many applications. These motors, while attaining a plurality of fixed selectable speeds due to the multiple operating taps by mechanical switching between the taps, have not been particularly well adapted for continuously variable speed usage. Rather they are designed to operate efficiently only at one best speed within a tap and inefficiencies may result when trying to run the motor at other than the designed speed. However, many systems, such as the above HVAC applications, would benefit greatly from having a wider range of motor speeds available.

Also in the past art, a variable range of speeds from one induction motor was obtained through the use of expensive controllers changing the frequency and voltage of the input to the motor windings, throughout the operating range of the induction motor. Expensive controllers such as these were necessary because, as the input to the motor windings strays farther from sinusoidal, motor efficiency and power factor drop while total harmonic distortion rises, resulting in unacceptable noise, heat, efficiency loss, and motor life. Further, known motor controllers utilizing inexpensive switching mechanisms, such as triacs, to control power to the motor windings by "chopping" the sinusoidal waveform input were thought to be of limited use in applications of continuously variable motor speed control.

Further, the development and utilization of multiple control algorithms and control board apparatuses for each individual motor, or motor application, within a generic application such as an HVAC system, results in increased expense for the manufacturer and consumer of such systems and may further complicate maintenance and repair of such systems.

It would therefore be desirable to obtain an efficient variable speed operation of multi-tap motors for HVAC systems. It would also be desirable to obtain such control over a family of such multi-tap motors or motor applications through the use of a single controller system.

SUMMARY OF THE INVENTION

The present invention provides a system of variable speed motor control that provides continuous variable speed motor control by serially and contiguously moving between taps of a multi-tap motor and further by modulating the current supplied to obtain a variable range of speeds within each tap of the multi-tap motor. The controller apparatus desirably uses a wave chop technique supplied by triacs to provide a low cost controller with continuous variable speed motor control. A desirable firing angle range is selected for the proper operation of each tap within the multi-tap motor to provide for a range of speeds while maintaining low heat operation.

Discussion of the modules will be given herein with respect to specific functional tasks or task groupings that are in some cases arbitrarily assigned to the specific modules for explanatory purposes. It will be appreciated by the person having ordinary skill in the art that variable speed multi-tap motors and their control systems according to the present invention may be arranged in a variety of ways, or that functional tasks may be grouped according to other nomenclature or architecture than is used herein without doing violence to the spirit of the present invention.

The motor control operation will generally start at one end of the motor range, either the highest tap or the lowest tap, and then move to each successive tap in a linear fashion based upon the percent of motor speed demanded by the controller. Each tap's operation range is selected to use a truncated or small wave chop firing angle, thus maximizing the signal to the motor for that tap and minimizing heat build up in the motor. Further, the linear nature of the control and the selected tap operating ranges provide a seamless transition from tap to tap thus providing continuous variable speed control.

When defined properly, a control system of the present invention can operate consistently and efficiently for an entire family of motors using the same controller. One controller and control algorithm can be applied to an entire family of multi-tap motors resulting in one standard variable speed motor controller being able to control an entire family of motors, or motor applications, providing continuous variable speed motor control over the full operating range for every multi-tap motor in the family.

BRIEF DESCRIPTION OF THE DRAWINGS

The aspects of this invention will be better understood from the following detailed description taken in conjunction with the drawings wherein.

Table 1 is a data chart for a family of multi-tap motors and motor applications suitable for HVAC applications.

Table 2 is a data chart for the selected control scheme of the family of motors and applications listed in Table 1.

Table 3 is a data chart showing selected control schemes for a four tap family of motors, with and without hysteresis provisions.

Table 4 is a data chart showing selected control schemes for a three tap family of motors, with and without hysteresis provisions.

DETAILED DESCRIPTION OF A PREFERRED EMBODIMENT

The exemplary application herein illustrates the invention for a modulating furnace line which contains five furnace size applications and three different multi-tap motors. A common controller was developed with one common algorithm that could be applied to the entire line of multi-tap motors and could handle all furnace sizes. The present invention utilizes a firing angle range for each tap of each multi-tap motor in a family of motors to be controlled and effectively links each tap to its tap-range capability and continuously passes the next segment of continuous variable speed control to the next tap when demand is changed.

Figure 1:
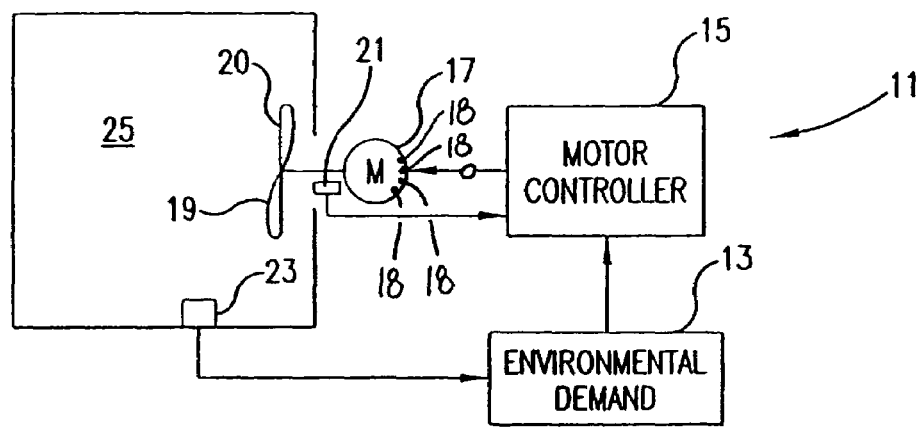
FIG. 1 is a block diagram of a variable speed application illustrating an environment of the present invention.

Referencing FIG. 1, an operational system 11, such as an HVAC system, has speed demand system 13 derived from environmental sensing and control units such as a thermostat or other furnace control apparatus; a motor controller 15 for accepting input from the environmental demand system 13 and outputting control signals, e.g., controlling line current and voltage, to a multi-tap motor 17 which drives a load 19, such as a blower unit, fan blades or other compressible fluid moving mechanisms as represented in FIG. 1 by a fan blade 20. A Hall effect device or other known angular speed measuring means 21 may be placed to measure motor speed and report the speed information back to the motor controller 15, if necessary or desired.

The speed demand system 13 is illustrated as having a temperature probe 23 in an air plenum 25 for its sensing unit upon which the speed demand for the multi-tap motor 17 would be determined and communicated to the motor controller 15. Various known demand systems and operations may be used in the system of the present invention. For example, it is known to use variable speed blowers for the combustion chamber or variable speed circulating fans, or both, with HVAC applications. Any HVAC application requiring a variable speed motor, such as set forth in U.S. Pat. Nos. 6,866,202 and 6,329,783, both of which are incorporated by reference herein in their entirety, may suitably use the present invention.

Figure 2:
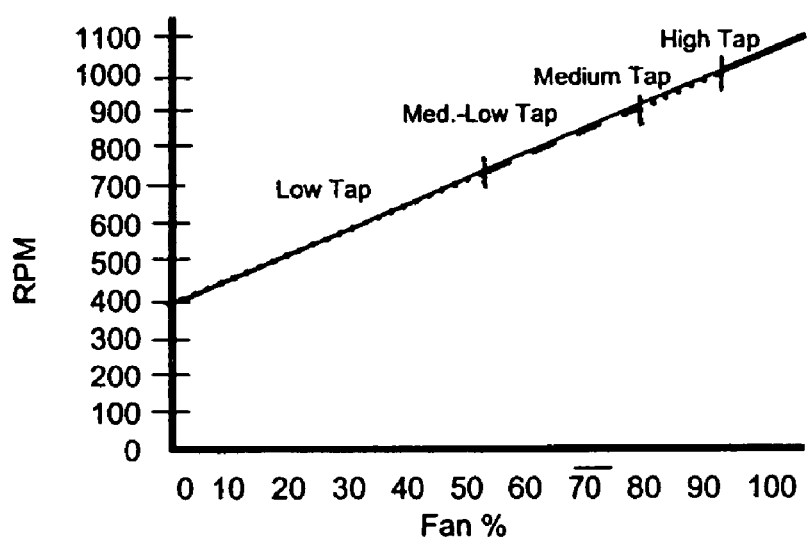
FIG. 2 is a graph showing the linear and contiguous operation of continuous multispeed control between taps of a multi-tap motor.

As seen in the graph of FIG. 2, a controller for a family of multi-tap motors has a percentage of fan speed representing the demand scale on the X axis and a corresponding speed (RPM) value on the Y axis. As shown in FIG. 2, the operation of the multi-tap motors can be linear and contiguous between the taps during variable speed operation of the motors. The demand for percentage of fan speed may be determined in any suitable fashion by a control algorithm and applied to a current control stage of the controller, e.g., a triac-enabled wave chopping device for regulating the incoming line load. A tap control stage of the controller will further select which tap of the motor is to be used, and the controlled current can be switched to that tap by any suitable switch means, based upon the percentage of motor speed demand required by the algorithm.

As seen in the graph of FIG. 2, a controller for a family of multi-tap motors has a percentage of fan speed representing the demand scale on the X axis and a corresponding speed (RPM) value on the Y axis. As shown in FIG. 2, the operation of the multi-tap motors can be linear and contiguous between the taps during variable speed operation of the motors. The demand for percentage of fan speed may be determined in any suitable fashion by a control algorithm and applied to a current control stage or current controller of the controller, e.g., a triac-enabled wave chopping device for regulating the incoming line load. A tap control stage of the controller will further select which tap 18 of the motor is to be used, and the controlled current can be switched to that tap 18 by any suitable switch means, based upon the percentage of motor speed demand required by the algorithm.

The controller is developed by initially collecting data concerning motor speed rpm (revolutions per minute) at various firing angles for each tap 18 on the motors. The desired operating range of speeds for each motor is defined, e.g., 400 RPM to 1100 RPM range, for the 0.5 horsepower (H.P.) motor operating a 60K BTU furnace as listed in Table 1. After the speed range is defined for a representative motor the lowest motor speed (400 rpm) of the range is assigned a value of 1% and the highest motor speed (1100 rpm) is assigned a value of 100%. The remaining RPM values are also stated as a percentage of the desired operating range, as illustrated in Table 1.

Since all taps 18 have a firing angle range associated with that respective tap, each tap 18 is displayed to show the firing angle range and the associated percents of the motor speed range associated with the firing angle range. By reviewing this data, the RPM, motor speed percent, and firing angles are identified for the entire multi-tap motor family. The information was taken for all three motors in the selected family of multi-tap motors and for the five furnace sizes, i.e., motor applications, that were to be controlled. The results are listed in Table 1.

The data of Table 1 was then used to develop a common controller and algorithm for selecting each tap 18 of the motors that can be applied to all motors and all furnace sizes. For example, as illustrated in Table 2, the defined controller selects the desired taps 18 of the motors based on a percentage of motor speed, to be selected as follows for a four tap motor of the exemplary family, wherein the operating conditions are regulated by the controller to have a low tap range of 1–50% motor speed, with a firing angle of from 80 to 40; a medium low tap range of 50–71% motor speed, with a firing angle of from 60 to 40; a medium tap range of 71–86% motor speed, with a firing angle of from 60 to 40; and a high tap range of 86–100% motor speed, with a firing angle of from 65 to 50.

The controller then defines the operating range for all taps 18 of each motor based on the common algorithm. For example, the low tap operating range is defined as 1% to 50%, even though the respective tap percentages at the high speed end of the low tap range are 50%, 64%, 71%, 44%, and 54%, for the motor applications listed in Table 1, respectively.

The second, or medium-low, tap ends its high speed operating range at 71% demand speed from the algorithm, even though the motor-taps are operating at 71%, 83%, 83%, 69%, and 80%, respectively. The third, or medium, tap is defined to end at 86%, even though the taps operate at 86%, 94%, 94%, 86%, and 92%, respectively. For the fourth, or high, tap all motors are able to achieve a high speed of 100%.

In selecting the tap control points it will be noted that each succeeding tap begins at the speed percentage where the previous tap leaves off. The present invention allows the motor controller to smoothly transition from one tap to the next because the actual tap percentages are the same or sequential at the interface between tap selections.

For example, on the 100K BTU furnace the low tap is actually at 44% of the range when it reaches the end of its range and it moves to the medium-low tap at a 46% actual percentage, even though the controller is commanding a 50% to a 51% transition.

Thus, as the controller commands an increase or a decrease in percentage of motor speed, the multi-tap controller and motor operation responds by moving to the next percentage indicated by the algorithm and sequentially moving through both the taps of the motor and the modulation, or firing angle, range of each tap. It does not matter what percentage of speed is commanded by the algorithm; only that the variable speed command is smooth and continuous. That is, the commanded speed percent from the controller is in some instances virtual, while each motor in the family of motors has been pre-selected to provide adequate variable speed performance due to their selected characteristics and chosen firing ranges within each tap.

The method for controlling the selection of a tap may be based on a linear scale of motor speed demand, e.g., switching from low tap to medium-low tap when a change from 50% to 51% is demanded, or a more sophisticated algorithm may be employed wherein the controller can make the decision of which tap to apply in adjacent and overlapping tap ranges by supplying current to that tap of the motor with the lowest firing angle, and hence with the least heat build-up during operation, which is thus best able to satisfy the speed demand.

As seen in Table 3, it will sometimes be desirable to account for hysteresis conditions in the operation of the multi-tap motor when switching between taps by defining control points with an overlap between taps to allow smooth operation up and down the variable speed control range. Thus, the percent of motor speed commanded by the controller may drop from 50% to 43% between the low tap and medium-low tap transition. The percent of motor speed commanded by the controller may drop from 71% to 68% between the medium-low tap and medium tap transition. The percent of motor speed commanded by the controller may drop from 86% to 81% between the medium tap and high tap transition.

As seen in Table 4, a similar hysteresis control scenario for a three tap motor can include the percent of motor speed commanded by the controller dropping from 86% to 61% between the medium tap and high tap transition.

Thus, according to the present invention, one algorithm can be adapted for the control of an entire family of motors. The result is a smooth transition from one tap to the next. Also, it will be realized that each of the multi-tap motors within an operating family will be selected to accommodate the normal operating speeds required for the equipment to be operated. Thus the multi-tap "wave-chop" technique of the present invention will operate smoothly over an entire family of motors and the common motor controller with its variable speed controller can smoothly operate all motors in the family.

The multi-tap motor is wired to the controller using all taps on the motor. The motor low tap wire is connected to the low tap location on the controller, the motor medium-low tap wire is connected to the medium-low tap location on the controller, the motor medium tap wire is connected to the medium tap location on the controller, and the motor high tap wire is connected to the high tap location on the controller. In the exemplary embodiments, 3-tap and 4-tap motors were discussed; however, the present invention may work effectively with any multi-tap, e.g., 2-tap, 5-tap, etc., motor. A further advantage to the present invention is that every wire from the multi-tap motor is connected in a manner that is expected by the installer.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention. The invention as disclosed herein may further be suitably practiced in the absence of any element, part, step, component, or ingredient which is not specifically disclosed herein.

We claim:

1. A variable speed controller for controlling a family of multi-tap electric motors or applications of the family of multi-tap electric motors, comprising:

a current controller varying a firing angle to be applied to a multi-tap motor to provide a range of motor speeds;
   means for connecting the variable speed controller to each of a plurality of taps on the multi-tap motor;
   the variable speed controller selecting a selected tap of the taps to be used and selecting a plurality of firing angles to apply within the selected tap; and
   a switch for applying the current from the current controller to the selected tap on the electric motor.

2. The variable speed controller of claim 1 wherein the range of motor speeds for each of the taps of the multi-tap motor is contiguous with an adjacent tap.

3. The variable speed controller of claim 1 wherein the range of motor speeds for each of the taps of the multi-tap motor is linear and contiguous throughout operation of the multi-tap motor.

4. The variable speed controller of claim 1 wherein the variable speed controller selects from a virtual range of the motor speeds totaling a 1–100% range of motor speeds.

5. The variable speed controller of claim 1 wherein the current controller comprises triacs for varying one of the firing angles of a wave chop on a line current.

6. The variable speed controller of claim 1 wherein the variable speed controller includes means for selecting a lowest number tap with a minimum chop on a line current which is necessary to achieve a demand.

7. The variable speed controller according to claim 1 further comprising:

the multi-tap motor being a four tap motor;
   first motor speed ranges for a low tap operation of the multi-tap motor in a first range of from about 1% to about 50% motor speed;
   second motor speed ranges for a medium-low tap operation of the multi-tap motor in a second range of from about 43% to about 71% motor speed;
   third motor speed ranges for a medium tap operation of the multi-tap motor in a third range of from about 68% to about 86% motor speed; and
   fourth motor speed ranges for a high tap operation of the multi-tap motor in a fourth range of from about 81% to about 100% motor speed.

8. The variable speed controller according to claim 7 further comprising:

a low tap firing angle range of from 80 to 40 degrees;
   a medium-low tap firing angle range of from 65 to 40 degrees;
   a medium tap firing angle range of from 63 to 40 degrees; and
   a high tap firing angle range of from 70 to 50 degrees.

9. The variable speed controller according to claim 1 further comprising:

the multi-tap motor being a three tap motor,
   first motor speed ranges for a low tap operation of the multi-tap motor in a first range of from about 1% to about 50% motor speed;
   second motor speed ranges for a medium tap operation of the multi-tap motor is in a second range of from about 50% to about 86% motor speed; and
   third motor speed ranges for a high tap operation of the multi-tap motor in a third range of from about 61% to about 100% motor speed.

10. The variable speed controller according to claim 9 further comprising:

a low tap firing angle range of from 80 to 40 degrees;
    a medium tap firing angle range of from 63 to 40 degrees; and
    a high tap firing angle range of from 70 to 50 degrees.

11. The variable speed controller according to claim 1 wherein the range of motor speeds for each pair of adjacent taps of the multi-tap motor overlap.

12. The variable speed controller according to claim 1 wherein the range of motor speeds for each pair of adjacent taps of the multi-tap motor are serial.

13. The variable speed controller according to claim 1 wherein the range of motor speeds for each pair of adjacent taps of the multi-tap motor share a common end point.

14. A method for controlling the operation of a variable speed multi-tap motor and controller combination, comprising:
    receiving a demand signal;
    determining a percentage of motor speed needed to satisfy a demand;
    selecting a selected tap of a plurality of taps of a multi-tap motor desirable for meeting a speed demand;
    selecting a firing angle for modulating a current to the selected tap; and
    supplying the current modulated at the firing angle to the selected tap.

15. The method of claim 14 further comprising: supplying current to a lowest tap of the multi-tap motor with a lowest firing angle able to satisfy the speed demand.

16. The method of claim 14 further comprising: selecting firing angles for each of the taps to minimize the firing angle and a heat build up of the multi-tap motor.

17. The method of claim 14 further comprising: moving from a first tap to a second tap of the taps at one of adjacent points and concurrent points in a linear demand scale.

18. The method of claim 14 further comprising: moving from a first tap to a second tap at overlapping points in a linear demand scale.

19. The method of claim 14 further comprising: modulating the current with triacs.

20. The method of claim 14 further comprising: imposing a single controller on a family of at least one of multi-tap motor types and applications.

21. A variable speed controller for controlling a multi-tap electric motor, the variable speed controller comprising:
    a motor controller varying a firing angle for each of a plurality of taps of the multi-tap motor and providing a range of motor speeds, the variable speed controller connected to each of the taps, the motor controller selecting a selected tap of the taps and selecting a range of firing angles for the selected tap, and a switch for applying a current to the selected tap.

22. The variable speed controller of claim 21 wherein the range of firing angles for each of the taps is selected to include one of a truncated and a small wave chop firing angle.

23. The variable speed controller of claim 21 wherein the range of motor speeds for each of the taps is contiguous with an adjacent tap of the taps.

* * * * *